US011825865B2

(12) United States Patent
Kastl et al.

(10) Patent No.: US 11,825,865 B2
(45) Date of Patent: Nov. 28, 2023

(54) TUBULAR FOOD CASING WITH TRANSFER FUNCTION

(71) Applicant: Kalle GmbH, Wiesbaden (DE)

(72) Inventors: Erna Kastl, Hünstetten (DE); Jens Fögler, Taunusstein (DE); Ulrich Delius, Frankfurt (DE); Martina König, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 309 days.

(21) Appl. No.: 15/817,576

(22) Filed: Nov. 20, 2017

(65) Prior Publication Data

US 2018/0139991 A1    May 24, 2018

(30) Foreign Application Priority Data

Nov. 24, 2016  (DE) .......................... 102016223297.5

(51) Int. Cl.
| | |
|---|---|
| *A23L 13/00* | (2016.01) |
| *A22C 13/00* | (2006.01) |
| *A23P 20/20* | (2016.01) |
| *A23L 27/20* | (2016.01) |
| *B32B 5/02* | (2006.01) |
| *B32B 7/12* | (2006.01) |
| *B32B 27/08* | (2006.01) |
| *B32B 27/12* | (2006.01) |
| *B32B 27/32* | (2006.01) |
| *B32B 37/12* | (2006.01) |
| *B32B 38/00* | (2006.01) |

(52) U.S. Cl.
CPC .......... *A23L 13/03* (2016.08); *A22C 13/0013* (2013.01); *A23L 27/20* (2016.08); *A23P 20/20* (2016.08); *B32B 5/022* (2013.01); *B32B 5/024* (2013.01); *B32B 5/026* (2013.01); *B32B 7/12* (2013.01); *B32B 27/08* (2013.01); *B32B 27/12* (2013.01); *B32B 27/32* (2013.01); *B32B 37/12* (2013.01); *A22C 2013/004* (2013.01); *A22C 2013/0043* (2013.01); *A22C 2013/0046* (2013.01); *A22C 2013/0053* (2013.01); *A22C 2013/0059* (2013.01); *A22C 2013/0063* (2013.01); *A22C 2013/0083* (2013.01); *A22C 2013/0096* (2013.01); *A23V 2002/00* (2013.01); *B32B 2038/008* (2013.01); *B32B 2262/04* (2013.01); *B32B 2307/51* (2013.01); *B32B 2307/516* (2013.01); *B32B 2307/518* (2013.01); *B32B 2307/718* (2013.01); *B32B 2309/105* (2013.01); *B32B 2439/70* (2013.01)

(58) Field of Classification Search
CPC ........ A22C 13/0013; A22C 2013/0053; A22C 2013/0059; A22C 2013/0093; A22C 2013/004; A22C 2013/0023; Y10T 428/1324; C09J 175/04; C09J 175/06; C09J 175/08

USPC ..... 426/105, 127, 129, 135; 428/34.8, 36.91
See application file for complete search history.

(56) References Cited

U.S. PATENT DOCUMENTS

| | | | | |
|---|---|---|---|---|
| 5,612,104 | A  * | 3/1997 | Grund ........................ | B32B 1/08 426/135 |
| 5,834,554 | A  * | 11/1998 | Duan ...................... | C08G 18/10 524/591 |
| 6,099,685 | A  * | 8/2000 | Ito .......................... | C09J 123/06 156/330 |
| 6,200,613 | B1 * | 3/2001 | Schafer .............. | A22C 13/0013 426/105 |
| 9,999,233 | B1 * | 6/2018 | Dinh Sybeldon .. | A22C 13/0013 |
| 2002/0037423 | A1* | 3/2002 | Yamamoto ............... | C08J 7/052 428/516 |
| 2005/0202130 | A1* | 9/2005 | Auf Der Heide ...... | A22C 11/12 426/135 |
| 2006/0251773 | A1* | 11/2006 | Auf Der Heide .. | A22C 13/0013 426/138 |
| 2009/0155430 | A1 | 6/2009 | Lee et al. | |
| 2009/0214722 | A1* | 8/2009 | Henze-Wethkamp ....................... | B32B 27/365 426/105 |
| 2009/0288791 | A1* | 11/2009 | Hammer ............ | A22C 13/0013 162/146 |
| 2011/0236539 | A1* | 9/2011 | Foegler .............. | A22C 13/0013 426/105 |
| 2012/0263836 | A1* | 10/2012 | Carlson .................... | B32B 7/12 426/127 |

FOREIGN PATENT DOCUMENTS

| | | | | | |
|---|---|---|---|---|---|
| CA | 2285493 | A1 * | 4/2000 | ......... | B65D 81/3415 |
| DE | 198 46 305 | A1 | 4/2000 | | |
| DE | 103 37 009 | A1 | 3/2005 | | |
| EP | 0 758 527 | A1 | 2/1997 | | |
| EP | 1152663 | B1 * | 10/2004 | ......... | A22C 13/0013 |
| EP | 2 298 549 | A1 | 3/2011 | | |

(Continued)

OTHER PUBLICATIONS

Bullinger, Hans-Jorg, Ed., Technology Guide, Springer, 2009 , p. 20 (Year: 2009).*

*Primary Examiner* — Lee E Sanderson
(74) *Attorney, Agent, or Firm* — ProPat, LLC

(57) ABSTRACT

A description is given of a tubular food casing having a fiber layer on the inside and having two or more polymer layers. The polymer layers include a first continuous polymer layer (A), with which the inner fiber layer or nonwoven-web layer is coated on the side of the tubular casing facing away from the inside, and completely covers the layer, and at least one polymer layer (B), and a monoaxially or biaxially oriented film based on polyamide and/or copolyamide. At least two of the polymer layers are joined to one another directly by a layer of adhesive. The inner fiber layer may absorb colour, smoke, aroma and/or flavour substance(s), such as liquid smoke or caramel, store these substances and transfer them to a food located within the casino. The casing is suitable as artificial sausage casing, especially for cooked-filling and scalded-emulsion sausage.

24 Claims, No Drawings

(56) References Cited

FOREIGN PATENT DOCUMENTS

| EP | 2 848 390 A1 | 3/2015 |
|----|---|---|
| WO | WO 2004/000026 A2 | 12/2003 |

* cited by examiner

TUBULAR FOOD CASING WITH TRANSFER FUNCTION

CROSS-REFERENCE TO RELATED APPLICATIONS

This application claims priority to German Patent Application 10 2016 223 297.5 filed Nov. 24, 2016, which is hereby incorporated herein by reference in its entirety.

FIELD OF THE INVENTION

The present invention relates to a tubular food casing having a fiber layer, which forms the inside of the food casing, and having two or more polymer layers. The invention additionally relates to a method for producing the tubular food casing and also to the use thereof as artificial sausage casing.

BACKGROUND OF THE INVENTION

Tubular polymeric casings are used predominantly in the production of cooked-filling and scalded-emulsion sausages. These food casings are required to observe a very wide variety of requirements in order to find application in practice. For example, these food casings must have a high barrier effect towards oxygen and water vapour, and must effect delivery of colour and aroma substances from the casino on to the food.

EP 0 758 527 A1 discloses a biaxially oriented food casing whose inside and outside each carry a layer predominantly comprised of aliphatic polyamide. In between there is at least one polyolefinic layer and at least one further layer, predominantly comprised of ethylene/vinyl alcohol copolymers.

EP 2 848 390 A1 describes a multilayer film—comprising at least seven layers—which beneath an outer layer based on polybutylene terephthalate (PBT) has further layers based on polyolefins, polyamides and ethylene/vinyl alcohol copolymers. At least one of the seven layers consists of an adhesion promoter.

U.S. Pat. No. 6,200,613 B1 and DE 198 46 305 A1 disclose food barrier casings for cooked-filling and scalded-emulsion sausages, hams and gammons, pickled products or processed cheese. In one preferred embodiment, the food casing consists of a barrier casing comprising two outer polyethylene layers and a layer of polyimide in between. The barrier casing is coated on the inside with an absorbent inner ply, such as a nonwoven cellulose fiber web.

A known problem in the production of tubular food casings is the establishment of the thermal shrinkage capacity. Shrinking must not be triggered by exposure to heat during the actual production of the tubular food casing. On the other hand, in the application of the casings, especially in the context of the scalding and/or cooking process, a certain rebound elasticity is absolutely necessary in order to ensure, subsequently, a taut, crease-free seating of the casing. Polymeric films acquire a marked rebound elasticity only when they have been oriented by stretching in the relevant direction. An additional effect of this orientation, however, is to induce thermal shrinkage capacity in the direction or directions of drawing. This shrinkage tendency can be reduced, though not entirely eliminated, by heat-setting of the film directly after stretching.

SUMMARY OF ADVANTAGEOUS EMBODIMENTS OF THE INVENTION

The object of the present invention, therefore, was to provide a tubular food casing which exhibits good rebound elasticity after filling and heating of the contents and at the same time possesses a high absorption capacity for colour and aroma substances, and also the capacity to transfer the latter to a food present within the casing. A further object of the present invention was to provide an economic method for a tubular food casing of this kind.

The object is achieved by means of a tubular food casing having a fiber layer or nonwoven-web layer on the inside, which is able to absorb, store and release colour, aroma and/or flavour substances, and having a monoaxially or biaxially oriented film based on polyamide and/or copolyamide, which is joined externally to the fiber layer or nonwoven-web layer. The fiber layer or nonwoven-web layer is also provided, on the side facing away from the food, with a continuous thermoplastic coating. The coating does not penetrate the whole of the fiber layer or nonwoven-web layer, and so the latter retains its capacity to absorb colour, aroma and/or flavour substances. By virtue of the rebound elasticity of the polyamide film, the casing still lies crease-free against the encased food even after the latter has been scalded or cooked.

DETAILED DESCRIPTION OF ADVANTAGEOUS EMBODIMENTS OF THE INVENTION

The invention relates accordingly to a tubular food casing comprising a fiber layer, which forms the inside of the tubular food casing, and two or more polymer layers, characterized in that the food casing
  (i) comprises a first polymer layer (A), with which the inner fiber layer is coated on the side of the tubular casing that faces away from the inside, with the first polymer layer constituting an uninterrupted layer which completely covers the fiber layer, and
  (ii) comprises at least one polymer layer (B) which consists of a monoaxially or biaxially oriented polyamide film,
where at least two polymer layers are joined to one another directly by a layer of adhesive.

The polymer layer or layers consist of one or more thermoplastic polymers and optionally minor fractions of customary organic and/or inorganic additives.

The tubular food casing of the invention preferably comprises at least one polymer layer (C) further to the first polymer layer (A) and the polymer layer (B).

The inner fiber layer which forms the inside of the tubular food casing consists of an absorbent fiber layer which is capable of absorbing and storing colour and aroma substances and of releasing them to the contents. The inner fiber layer may be a woven fabric, knitted fabric, a nonwoven fiber web or a fiber paper. Having proven to be particularly advantageous in terms of the capacity to absorb colour and aroma substances and to release them to the contents is a nonwoven fiber web consisting of fibers comprised of a thermoplastic polymer and cellulose fibers. In one particularly preferred embodiment, the thermoplastic fibers are joined firmly to one another at the points of intersection after at least partial melting.

The fibers of thermoplastic polymer generally have a thickness of 0.5 to 8 denier (den), preferably 1 to 5 den. Their length is in general 0.3 to 15 mm, preferably 4 to 8 mm. The fraction of the fibers of thermoplastic polymer, based on the weight of the nonwoven fiber web, is 1 to 20% by weight, preferably 3 to 17% by weight, more preferably 6 to 14% by weight.

The cellulose fibers are preferably hemp fibers and/or abaca fibers. Instead of or in addition to the hemp fibers and/or abaca fibers, it is also possible to use other vegetable cellulosic fibers or vegetable fibers derived therefrom, especially chemically modified vegetable fibers, and/or fibers of regenerated cellulose (viscose fibers).

The inner fiber layer is preferably a nonwoven fiber web or a fiber paper. It generally has a basis weight in the range from 10 to 70 g/m², preferably from 20 to 55 g/m², more preferably from 25 to 35 g/m².

The first polymer layer (A) is an uninterrupted layer which completely covers the fiber layer on the side facing away from the inside, in other words the side facing away from the contents. In this arrangement, the polymer layer (A) surrounds the fibers of the fiber layer at least partially, in order to ensure that there is mechanical anchoring of the polymer in the fiber layer. The first polymer layer (A) completely covers the fiber layer on the inside that later on is facing the food. This ensures that there is no migration of components from the layer or layers of adhesive through the fiber material on to the contents.

The first polymer layer (A), with which the inner fiber layer is coated on the side of the tubular casing that faces away from the inside, preferably comprises an olefin (co) polymer. There are no specific restrictions on the olefin (co)polymers, provided that they are capable of completely covering the inner fiber layer. Preferred olefin (co)polymers are polyethylene, modified polyethylene, ethylene/α-olefin copolymers, polypropylene, ethylene/vinyl ester copolymers, ethylene/vinyl alcohol copolymers and ethylene/(meth)acrylic ester copolymers. The olefin (co)polymer is more preferably a polyethylene or an ethylene/1-octene copolymer.

The tubular food casing further comprises at least one polymer layer (B) which consists of a monoaxially or biaxially oriented polyamide film.

Monoaxial or biaxial stretching is understood by the skilled person to refer to the transverse and/or longitudinal stretching of the polyamide film at temperatures between the glass transition temperature and the melting temperature of the polyamide. As a result of the monoaxial or biaxial orientation, the film acquires Hooke-elastic properties in the direction of the stretching. The stretching causes orientation of the chain-like molecules and a strain-induced crystallization. This leads to a considerable increase in the strength of the polyamide layer, to a Hooke-elastic rebound behaviour, and also to a thermal shrinkage capacity on the part of the food casing. The latter is dependent on whether or to what extent the polyamide film has been heat-set after stretching. The shrinkage of the polyamide film and hence of the food casing begins in general at about 80° C.

The tubular food casing is elastic and surrounds the contents without creases even after filling with the contents and after the cooking or scalding operation. Furthermore, together optionally with one or more further polymer layers (C), the polyamide layer (B) acts as a barrier to oxygen and/or Water vapour and gives the tubular food casing the necessary strength.

The polymer layer (B) preferably comprises at least one biaxially oriented polyamide film. The polyamide film consists essentially of aliphatic (co)polyamides. The term "(co) polyamide" here stands for "polyamide and/or copolyamide". A preferred polyamide film is one consisting predominantly or entirely of aliphatic polyamides and/or (co)polyamides. Preferred aliphatic polyamides are polyamide 6, polyimide 6.6, polyamide 6/6.6, polyamide 6,10, polyamide 6/12, and mixtures thereof. The polyamide film may further comprise customary additives in minor proportions (<5% by weight, based on the weight of the film), examples being anti-blocking agents, lubricants, antistats, stabilizers and/or colour pigments. The monoaxially or biaxially oriented polyamide film usefully has a thickness in the range from 5 to 60 μm, preferably from 10 to 40 μm, more preferably from 15 to 25 μm.

The monoaxially or biaxially oriented polyamide film is preferably partially heat-set. Heat-setting is a heat treatment in which there is partial relaxation of the oriented polymer chains. This prevents excessive shrinkage of the film on exposure to heat.

The tubular food casing of the invention further comprises at least one layer of adhesive. Having proven to be particularly advantageous are reactive adhesive systems which comprise, as reactive components, a liquid diisocyanate and a liquid diol. The fully reacted adhesive is preferably a polyesterurethane or polyetherurethane. These adhesives have the advantage that after the diisocyanate component and the diol component have been mixed, they remain workable for a certain time and subsequently cure without evaporation of solvent and without heating. This is especially advantageous because there is no need for additional heating during the production of the tubular food casing and, consequently, any shrinkage of the food casing during adhesive curing is avoided.

The layer of adhesive is preferably formed from an adhesive comprised of at least one diisocyanate and at least one diol. These components are preferably aliphatic, cycloaliphatic or aromatic diisocyanates and, respectively, polyesterdiols or polyetherdiols. The layer of adhesive generally has a thickness of 1 to 10 μm, preferably of 1.5 to 6 μm, more preferably of 2 to 4 μm.

Further to the first polymer layer (A) and the at least one further polymer layer (B), the tubular food casing of the invention preferably comprises at least one further polymer layer (C). The polymer layer (C) preferably comprises an olefinic (co)polymer, preferably polyethylene, modified polyethylene, an ethylene copolymer, polypropylene, an ethylene/vinyl acetate copolymer or an ethylene/vinyl alcohol copolymer. If the food casing comprises two or more polymer layers (C), these layers may have the same or a different polymer composition.

According to the present invention, at least two polymer layers are joined to one another directly by the at least one layer of adhesive. According to one embodiment of the present invention, the first polymer layer (A) is joined to the at least one polymer layer (B) directly by a layer of adhesive, or the first polymer layer (A) is joined to a polymer layer (C) directly by a layer of adhesive, and a polymer layer (A) is applied to said polymer layer (C) with or without an adhesive layer in between.

According to one embodiment of the present invention, a polymer layer (C) is applied to the first polymer layer (A) without a layer of adhesive in between. The polymer layer (C) in turn is joined to a polymer layer (B) directly by a layer of adhesive.

If the tubular food casing comprises more than one layer of adhesive, according to one embodiment of the present invention, the first polymer layer (A) is joined to a polymer layer (B) directly by a layer of adhesive, and the polymer layer (8) is joined to a polymer layer (C) directly by a layer of adhesive, or the first polymer layer (A) is joined to a polymer layer (C) directly by a layer of adhesive, and the polymer layer (C) is joined to a polymer layer (B) directly by a layer of adhesive.

The tubular food casing may also comprise further polymer layers (C) or further adhesive layers and polymer layers. (C). According to one embodiment of the present invention, the first polymer layer (A) is joined to a polymer layer (B) directly by a layer of adhesive, this polymer layer (B) is joined to a polymer layer (C) directly by a layer of adhesive, and this polymer layer (C) in turn is joined to a further polymer layer (C) directly by a layer of adhesive.

The food casing preferably has one of the following structures:

BOPA//adhesive//PE//fiber paper or nonwoven fiber web

BOPA//adhesive//PE//EVA if fiber paper or nonwoven fiber web

SOFA//PE//adhesive//PE//fiber paper or nonwoven fiber web

PE//BOPA//PE//adhesive//PE//fiber paper or nonwoven fiber web

PE//EVOH//BOPA//adhesive//PE//fiber paper or nonwoven fiber web

PE//adhesive//BOPA//adhesive//PE//fiber paper or nonwoven fiber web

PE//adhesive//EVOH//adhesive//BOPA II adhesive//PE//fiber paper or nonwoven fiber web In the listing BOPA stands for a biaxially oriented film of aliphatic polyamide, EVA stands for an ethylene/vinyl acetate copolymer, EVOH stands for an ethylene/vinyl alcohol copolymer (=hydrolysed EVA) and PE stands for polyethylene.

The tubular food casing has an overlapping longitudinal seam, and this longitudinal seam may be bonded, stitched, welded or sealed. The longitudinal seam is preferably bonded. Alternatively, the longitudinal seam may also be produced with a film strip (sealing band) which is arranged centrally over the butt-joined ends (web edges) of the food casing.

The tubular food casing of the invention generally has a wall thickness of 20 to 160 μm, preferably of 50 to 150 μm, more preferably of 100 to 130 μm, and an internal diameter in the range from 20 to 250 mm, preferably from 40 to 180 mm, more preferably from 60 to 160 mm.

The food casing generally exhibits a water vapour permeability of 3 to 100 $g/m^2$ d, preferably of 10 to 50 $g/m^2$ d, measured according to DIN 53 122 with unilateral incidence of air at 85% relative humidity at 23° C. The oxygen permeability is generally 5 to 100 $cm^3/m^2$ d, preferably 10 to 80 $cm^3/m^2$ d, determined according to DIN 53 380 at 23° C. and 53% relative humidity.

The inner fiber layer is able to absorb and store a colour, smoke, aroma and/or flavour substance, such as liquid smoke or caramel, and to transfer it to a food present within the casing. Another subject of the present invention is therefore a tubular food casing in which the inner fiber layer of the tubular casing is impregnated with colour, smoke, aroma and/or flavour substance(s). These colour, smoke, aroma and/or flavour substances are transferred in liquid or solid form to the food in the completed cooked-filling or scalded-emulsion sausage.

The invention additionally relates to a method for producing the food casing described above, comprising the steps of (i) coating a fiber paper or nonwoven fiber web, on the side facing away from the subsequent inside of the casing, with a thermoplastic polymer, to give an uninterrupted first coating;

(ii) optionally applying further layers of thermoplastic polymer to the first coating;

(iii) providing a monoaxialiy or biaxially stretched film that is shrinkable on exposure to heat and is based on aliphatic (co)polyamide, or a laminate comprising such a polyamide film;

(iv) joining the monoaxially biaxially stretched film based on aliphatic (co)polyamide, or the laminate, to the coated side of the fiber paper or nonwoven fiber web with a polymer layer to form an assembly, the joining taking place at a temperature which is not sufficient to trigger the shrinkage of the polyamide film;

(v) optionally cutting the assembly obtained in step (iv) into strips;

(vi) forming the assembly obtained in step (iv), or a strip thereof obtained in step (v), into a tube having overlapping or abutting longitudinal edges; and (vii) joining the overlapping longitudinal edges, by an adhesive, for example, or joining the abutting longitudinal edges by a seam band, e.g. by a sealing strip or a film strip coated with pressure-sensitive adhesive.

After the coated fiber paper or nonwoven fiber web has been joined to the polyamide film, or the laminate has been joined to such a film, a flat product is initially obtained. The flat product is cut into strips, with the strips having a width of 70 to 800 mm, preferably 100 to 600 mm, more preferably 130 to 560 mm. In a further method step, the strips are bonded, stitched, welded or sealed to form a tube with an overlapping longitudinal seam or a butt seam (abutting longitudinal edges) with a film strip over it.

The joining of the longitudinal edges in step (vii) may take place, for example, with an adhesive seam or with a film strip which is placed over the abutting edge. The film strip may have a layer of adhesive on one side and may be placed by this side over the abutting edge. It is also possible for the film strips to be joined to the longitudinal edges by stitching, welding or sealing.

In the case of the joining in step (iv), the adhesive may be applied to the coated fiber paper or nonwoven fiber web or to the polyamide film, or to the laminate with the polyamide film. The adhesive is preferably a two-component system based on a diisocyanate and a diol. In the completed food casing, accordingly, the layer comprises a polyesterurethane or polyetherurethane. The actual joining takes place usefully in a pressing-roll station at a pressure of 1.5 to 3 bar.

As set out in the exemplary layer sequences given above, there may be additional layers of adhesive in the laminate with the biaxially oriented polyamide film.

The adhesive is applied preferably at room temperature to the coated side of the fiber paper or nonwoven fiber web or of the polyamide film, or of the laminate with the polyamide film. The adhesive is applied usefully at a pressure of 0.2 to 50 bar, preferably of 1 to 25 bar, more preferably of 5 to 10 bar, An adhesive with a diol and a diisocyanate has the advantage that it can be applied at relatively low pressure at room temperature via simple pumping systems and nozzles.

The tubular food casing is used in particular as artificial sausage casing, preferably for scalded-emulsion or cooked-filling sausage.

The casing of the invention exhibits a distinct rebound elasticity, and so even after scalding or cooking it lies crease-free against the food. This minimizes the emergence/ the incidence of meat juice. An unelastic casing, conversely, would no longer tautly surround the contents after cooling. With such a casing, there may be an accumulation of meat juice between the surface of the contents and the food casing ("purge") and, consequently, losses of weight in the case of the peeled end product.

The examples which follow are intended to illustrate the invention without limiting it.

Example 1

Production of a Tubular Food Casing

A biaxially oriented, partially heat-set polyamide film (draw ratio 1:2.9 in machine direction and 1:3.4 in cross direction) having a material thickness of 12 μm and a polyethylene-coated nonwoven fiber web having a basis weight of 47 g/m², were combined on a laminating unit to form an assembly. First of all, the biaxially oriented polyamide film was coated with a polyurethane adhesive. The coat weight of the adhesive here was 2.4 g/m². From a second unwinder, the polyethylene-coated nonwoven fiber web was supplied to the pressing station of the laminating unit. The adhesive-coated, biaxially oriented polyamide film and also the polyethylene-coated nonwoven fiber web were then bought together in a press roll station and compressed with a pressure of 2 bar, in this operation, the polyethylene-coated side of the nonwoven fiber web was laminated against the biaxially oriented polyamide film. After the press roll station, the material was supplied for winding. 8000 m of the casing were wound into a roll in this operation. The laminating operation took place at a speed of 180 m/min. After an adhesive reaction time of 5 days, the assembly was slit on a slitting unit into a plurality of strips in a width of 330 mm and then bonded to form a tube with an overlapping adhesive seam. The roll product was subsequently impregnated with liquid smoke (ENVIRO® 24P from Red Arrow Co.). This was done by introducing liquid smoke into the casing via the tube end and then passing the casing horizontally through a pair of driven squeeze rolls. Impregnation of the casing took place at a speed of 50 m/min. Directly thereafter, the impregnated casing was wound into a roll. The application weight of the impregnation was 23 g/m².

Sections of the casing were filled plumply with scalded-emulsion sausage meat and sealed at the ends using metal caps. The filled sausages were hung up in a cooking chamber customary for the production of scalded-emulsion sausage, and were heated to a core temperature of 72° C. by introduction of steam for about 2 h ascendingly. The scalded-emulsion sausages were then cooled to room temperature by showering with cold water. Even after this procedure, the casing still lay tautly against the sausage meat, without creases.

The filling and the subsequent heating of the filled sausages at a chamber temperature of 85° C. caused mechanical expansion of the casing (about 10 to 15% in longitudinal and cross directions). On subsequent cooling, the contents contracted again, and the dimensions of the sausages reduced again approximately to the same level as before heating.

After the removal of the casing by peeling, the sausage meat presented a distinct smoke colour and also an intense smoke aroma.

Example 2

Production of a Tubular Food Casing

A cellulose fiber paper with a basis weight of 30 g/m² was coated with a polyethylene on an extrusion coating line. For this purpose, the polyethylene was melted in an extruder at a temperature of 280° C. and supplied to a wide slot die. The weight per unit area of the extruded polyethylene coating was 23 g/m², This produces an overall weight per unit area of 53 g/m². This material was laminated on a laminating unit with a 20 μm biaxially oriented polyamide film (draw ratio 1:2.9 in machine direction, 1:3.4 in cross direction), Here, first of all, the biaxially oriented polyamide film was coated with a polyurethane adhesive. The adhesive coat weight was 3 g/m². In the press roll station of the laminating unit, the polyethylene-coated cellulose paper met the biaxially oriented polyamide film and the two components were united to form a laminate at an applied pressure of 1.8 bar, and the laminate was wound up. After an adhesive reaction time of 5 days, the material was slit to a width of 500 m and bonded to form a tube, Impregnation took place with a caramel formula, with an impregnation application weight of 34 g/m².

The casing was filled with scalded-emulsion sausage meat, heated to a core temperature of 72° C.; and then stored for 1 day at 5° C. and about 30% relative humidity. After that the casing was removed by peeling. The exposed sausage meat has a distinct caramel colour.

That which is claimed:

1. Tubular food casing comprising an inner fiber layer, which forms the inside of the tubular food casing, and two or more polymer layers, wherein the polymer layers
   (i) comprise a first polymer layer (A), with which the inner fiber layer is coated on the side of the tubular casing that faces away from the inside, with the first polymer layer ensuring anchoring, constituting an uninterrupted layer and completely covering the fiber layer, and
   (ii) comprise at least one polymer layer (B) which consists of a monoaxially or biaxially oriented heat set film based on polyamide and/or copolyamide,
   where at least two of the polymer layers are joined to one another directly by a layer of adhesive,
      the first polymer layer (A), which coats the inner fiber layer, comprises an olefin (co)polymer, the polymer layer (B) is disposed on a side of polymer layer (A) opposite the inner fiber layer, and
      the inner fiber layer consists of a nonwoven fiber web made of fibers comprising a thermoplastic polymer and cellulose fibers,
      the polymer layer (B) is the outermost film layer or is comprised within a laminate forming the outermost film layer, and the tubular food casing is a scalded-emulsion or cooked-filling sausage casing.

2. Food casing according to claim 1, wherein the food casing comprises at least one polymer layer (C).

3. Food casing according to claim 2, wherein the at least one polymer layer (C) comprises polyethylene, modified polyethylene, ethylene copolymers, polypropylene, ethylene/vinyl acetate copolymers and/or ethylene/vinyl alcohol copolymers.

4. Food casing according to claim 2, wherein the food casing comprises a plurality of polymer layers (C), with the various polymer layers (C) comprising the same polymer or different polymers selected from the group consisting of polyethylene, modified polyethylene, ethylene copolymers, polypropylene, ethylene/vinyl acetate copolymers and ethylene/vinyl alcohol copolymers.

5. Food casing according to claim 2, wherein the first polymer layer (A) is joined by a layer of adhesive directly to a polymer layer (B), or the first polymer layer (A) is joined by a layer of adhesive directly to a polymer layer (C).

6. Food casing according to claim 2, wherein the first polymer layer (A) is joined by a layer of adhesive directly to a polymer layer (B), and the polymer layer (B) is joined by a layer of adhesive directly to a polymer layer (C), or the first polymer layer (A) is joined by a layer of adhesive directly to a polymer layer (C), and the polymer layer (C) is joined by a layer of adhesive directly to a polymer layer (B).

7. Food casing according to claim 1, wherein the fibers made of thermoplastic polymer have an average length of 0.3 to 15 mm and a thickness of 0.5 to 8.0 den, and the fraction of the fibers made of thermoplastic polymer is 1 to 20% by weight, based on the weight of the nonwoven fiber web.

8. Food casing according to claim 1, wherein the cellulose fibers are hemp fibers or abaca fibers or fibers of regenerated cellulose.

9. Food casing according to claim 1, wherein the inner fiber layer has a basis weight in the range from 10 to 70 g/m².

10. Food casing according to claim 9, wherein the nonwoven fiber web has a basis weight in the range from 20 to 55 g/m².

11. Food casing according to claim 1, wherein the olefin (co)polymer is selected from the group consisting of polyethylene, modified polyethylene, ethylene/α-olefin copolymers, polypropylene, ethylene/vinyl ester copolymers, ethylene/vinyl alcohol copolymers and ethylene/(meth)acrylic ester copolymers.

12. Food casing according to claim 1, wherein the polymer layer (B) has a thickness in the range from 5 to 60 μm.

13. Food casing according to claim 12, wherein the polymer layer (B) has a thickness in the range from 10 to 40 μm.

14. Food casing according to claim 1, wherein the layer of adhesive comprises a two-component reactive adhesive which is based on a diisocyanate that is not an aromatic diisocyanate and a diol.

15. Food casing according to claim 1, wherein the at least one layer of adhesive has a thickness in the range from 1 to 10 μm.

16. Food casing according to claim 15, wherein the at least one layer of adhesive has a thickness in the range from 1.5 to 6 μm.

17. Food casing according to claim 1, wherein the inner fiber layer is impregnated with colour, smoke, aroma and/or flavour substance(s).

18. Artificial sausage casing comprising the food casing according to claim 1, wherein said casing lies crease-free against food within the casing after scalding or cooking.

19. The food casing according to claim 1, wherein the olefin (co)polymer is a thermoplastic polymer.

20. Food casing according to claim 1, wherein the fibers comprising thermoplastic polymer are joined to one another at points of intersection via at least partial melting.

21. Tubular food sausage casing according to claim 1, wherein said casing comprises overlapping or abutting longitudinal edges joined with a seam.

22. Method for producing the food casing according to claim 1, comprising the steps of:
(i) coating the nonwoven fiber web, on the side facing away from the subsequent inside of the casing, with a thermoplastic polymer, to give an uninterrupted first coating;
(ii) optionally applying further layers of thermoplastic polymers to the first coating;
(iii) providing a monoaxially or biaxially stretched film that is shrinkable on exposure to heat and is based on aliphatic (co)polyamide or providing a laminate comprising such a polyamide film;
(iv) joining the monoaxially or biaxially stretched film based on aliphatic (co)polyamide, or the laminate, to the coated side of the nonwoven fiber web with a layer of adhesive to form an assembly, the joining taking place at a temperature which is not sufficient to trigger the shrinkage of the polyamide film;
(v) optionally cutting the assembly obtained in step (iv) into strips;
(vi) forming the assembly obtained in step (iv), or a strip thereof obtained in step (v), into a tube having overlapping or abutting longitudinal edges; and
(vii) joining the longitudinal edges.

23. Method according to claim 22, wherein the longitudinal edges overlap and are joined with a seam, the joining of the overlapping longitudinal edges taking place by bonding, stitching, welding or sealing, or in that the longitudinal edges abut one another and are joined with a film strip which is placed centrally over the abutting edge.

24. Method according to claim 23, wherein the film strip has a layer of adhesive and is placed over the abutting longitudinal edges, so that the layer of adhesive is located between the abutting longitudinal edges and the film strip, or in that the film strip is joined by stitching, welding or sealing to the abutting longitudinal edges.

* * * * *